(12) United States Patent
Jackson et al.

(10) Patent No.: US 7,404,849 B2
(45) Date of Patent: *Jul. 29, 2008

(54) INKJET INK SET FOR IMPROVED COLOR REPRODUCTION

(75) Inventors: Christian Jackson, Wilmington, DE (US); Kuo Hsiung Kung, Wilmington, DE (US); Richard Douglas Bauer, Kennett Square, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 124 days.

This patent is subject to a terminal disclaimer.

(21) Appl. No.: 11/105,258

(22) Filed: Apr. 13, 2005

(65) Prior Publication Data

US 2005/0235867 A1    Oct. 27, 2005

Related U.S. Application Data

(60) Provisional application No. 60/564,062, filed on Apr. 21, 2004.

(51) Int. Cl.
*C09D 11/02* (2006.01)
*B41J 2/01* (2006.01)

(52) U.S. Cl. .................................. 106/31.27; 347/100

(58) Field of Classification Search .............. 106/31.27; 347/100
See application file for complete search history.

(56) References Cited

U.S. PATENT DOCUMENTS

| | | | |
|---|---|---|---|
| 5,085,698 A | 2/1992 | Ma et al. | |
| 5,231,131 A | 7/1993 | Chu et al. | |
| 5,753,016 A | 5/1998 | Hayashi et al. | |
| 5,833,743 A | 11/1998 | Elwakil | |
| 5,988,791 A | 11/1999 | Miyashita et al. | |
| 6,053,969 A | 4/2000 | Lauw et al. | |
| 6,336,721 B1 | 1/2002 | Provost et al. | |
| 6,399,674 B1 * | 6/2002 | Kashiwazaki et al. | 523/161 |
| 6,426,014 B1 | 7/2002 | Silverbrook | |
| 6,443,555 B1 | 9/2002 | Silverbrook et al. | |
| 6,508,549 B1 | 1/2003 | Romano, Jr. et al. | |
| 6,509,916 B1 | 1/2003 | Kakinuma et al. | |
| 6,530,986 B2 * | 3/2003 | Walker et al. | 106/31.6 |
| 6,572,692 B1 * | 6/2003 | Osumi et al. | 106/31.6 |
| 6,588,879 B2 | 7/2003 | Kushner et al. | |
| 6,673,140 B2 | 1/2004 | Tyrell et al. | |
| 6,676,738 B2 * | 1/2004 | Sano et al. | 106/31.75 |
| 7,135,208 B2 * | 11/2006 | Kubota | 427/256 |
| 2002/0014184 A1 | 2/2002 | Yeh et al. | |
| 2002/0033863 A1 | 3/2002 | Silverbrook | |
| 2004/0035320 A1 * | 2/2004 | Sano et al. | 106/31.6 |
| 2004/0100643 A1 | 5/2004 | Jones et al. | |
| 2005/0284329 A1 * | 12/2005 | Jackson et al. | 106/31.6 |
| 2005/0284330 A1 * | 12/2005 | Jackson | 106/31.6 |
| 2006/0082629 A1 * | 4/2006 | Kato et al. | 347/100 |
| 2006/0092252 A1 * | 5/2006 | Wickramanayake | 347/100 |
| 2006/0107868 A1 * | 5/2006 | Potenza et al. | 106/31.5 |
| 2006/0135648 A1 * | 6/2006 | Sawada et al. | 523/160 |

FOREIGN PATENT DOCUMENTS

| | | |
|---|---|---|
| EP | 0 694 407 B1 | 1/1996 |
| EP | 0 556 649 B1 | 6/1999 |
| EP | 0 936 074 A1 | 8/1999 |

OTHER PUBLICATIONS

International Search Report, dated Jul. 2005.

* cited by examiner

*Primary Examiner*—Helene Klemanski

(57) ABSTRACT

The present invention pertains to a dye-based inkjet ink set and, more particularly, to an ink set with at least six differently colored inks. The ink set includes at least a cyan, magenta, yellow, red, blue and green ink.

25 Claims, No Drawings

INKJET INK SET FOR IMPROVED COLOR REPRODUCTION

CROSS-REFERENCE TO RELATED APPLICATIONS

This application claims priority under 35 U.S.C. §119 from U.S. Provisional Application Ser. No. 60/564,062 (filed Apr. 21, 2004), the disclosure of which is incorporated by reference herein for all purposes as if fully set forth.

BACKGROUND OF THE INVENTION

The present invention pertains to a dye-based inkjet ink set and more particularly to an ink set with at least six differently colored inks. The ink set includes at least a cyan, magenta, yellow, red, blue and green ink.

Inkjet printing is a non-impact printing process in which droplets of ink are deposited on a substrate, such as paper, to form the desired image. The droplets are ejected from a printhead in response to electrical signals generated by a microprocessor. Inkjet printers offer low cost, high quality printing and have become a popular alternative to other types of printers.

Color characteristics of dye-containing inks play an important role in the quality of the printed ink-jet image. Perceived color quality can be characterized using any one of several color-space systems such as CIELAB (CIE No. 15.2, *Colorimetry*, 2nd. Ed., Commission Internationale de l'Eclarage, Vienna, Austria, 1986) or Munsell (*Munsell Book of Color*, Munsell Color Co., Baltimore, Md., 1929), as is well known in the art. With respect to Munsell color space, a given color is defined using three terms, namely Hue, Value and Chroma. With respect to CIELAB color space, a color is defined using three terms L*, a* and b*. In this system L* defines the lightness of the color and it ranges from 0 (black) to 100 (white). The terms a* and b* together define the hue, where a* ranges from a negative number (green) to a positive number (red) and b* ranges from a negative number (blue) to a positive number (yellow). Additional terms such as hue angle (h°) and chroma (C*) can also be used to describe a given color instead of a* and b* wherein $$h^o = \tan^{-1}\left(\frac{b^*}{a^*}\right) \quad \text{Equation 1}$$

$$C^* = \sqrt{a^{*2} + b^{*2}} \quad \text{Equation 2}$$

To achieve full color images, ink jet printers typically employ a cyan ("C"), magenta ("M") and yellow ("Y") ink. These colors are known as subtractively-mixing primaries, as light is subtracted as it passes through the colorant. When these colors are mixed in pairs they form red, green and blue (so-called "secondaries"), and when all are mixed together they form black. Thus these three-color inks can be used to print the entire range of hues with good chromaticity and/or color saturation.

The range of colors that a given ink set can print is called the color gamut, and can be described in the CIELAB system by the volume in the L*a*b* color space that encompasses a palette of representative colors that can be printed by the ink set on a given substrate. While a CMY ink set can produce all possible color hues, the color gamut does not encompass all the colors that can be perceived by the human eye. Thus there is still a desire to improve the printed image quality and extend the range of colors that can be printed.

One approach to improved color is the development of new cyan, magenta and yellow dyes that give higher chroma on paper while still maintaining or improving other desired characteristics such as light-fastness and water-fastness. This approach is taken, for example, in U.S. Pat. No. 6,053,969 and U.S. Pat. No. 6,673,140.

Another approach is to expand the ink set used for printing to include additional inks that improve image quality or color gamut. There are three ways in which expanded ink sets have been employed.

One way is by including inks of the same hue but lower concentration (so-called "lights"). Light colors improve image quality by producing smoother tonal gradations and light colors in an image. For light colors, the "light" or "photo" inks, which typically have 10%-20% of the dye content of the full-strength colors, are used. For intermediate strength colors, "light" and full-strength inks are mixed. For the darkest colors only full-strength ink drops are used. Thus a smooth gradation of color tones can be obtained.

A further advantage of using "lights" is that it allows the dye concentration of the full-strength inks to be increased further without having the problem of dark sparsely spaced dots on the image. The higher concentration inks produce higher chroma secondary colors when mixed on high quality photo papers, and they also produce a darker CMY process black. These two effects serve to enhance the color gamut significantly.

U.S. Pat. No. 5,833,743 discloses how up to three different concentrations of each of the primary hues can be used to greatly increase the color gamut obtainable from a CMY ink set. Typically "light" inks are only used for cyan and magenta as yellow is light enough so that any graininess is not objectionable.

U.S. Pat. No. 6,509,916 discloses a printing method where a light ink of a different hue is added to the three-color set in order to improve improved gradation reproduction and expand the color gamut.

A second way in which an expanded ink set is employed is by including both a dye-based black ("K") ink and a pigmented black ink (along with CMY dyes). Most commercial ink jet printers use a pigmented black ink as this gives high optical density and sharp text on plain paper; however, the pigmented black has lower gloss than the dyes and looks flat when used with dyes on photographic papers. Thus printers use a combination of CMY to achieve black when printing photographs to maintain high gloss images. The optical density of such a combination block, however, is lower than using a true black ink and also requires three times as much ink to be used, so photo printers use a special high optical density black dye ink in addition to CMY to improve the images. Previously mentioned U.S. Pat. No. 6,673,140 discloses specific black dye inks to be used to improve color gamut of CMY ink sets.

A third way an expanded ink set is employed is by further including more inks with hues other than CMY. In some cases this additional ink may be what is known as a spot color, where the image to be printed contains an abundance of a certain color and so that color is specifically added to the ink set. This spot color is not necessarily outside the existing color gamut of the CMY ink set. In the case where the desired color is inside the gamut, adding the ink still provides the advantage of using less ink since a single ink is used rather than a mixture, and it also may provide improved light color tones, again by avoiding using a mixture of other colors. As another example the digital image to be printed may contain a certain color that is difficult to accurately print with the existing ink set and that color can be selected as an additional ink for the ink set. U.S. Pat. No. 6,588,879 discloses a method for selecting inks for textile printing that addresses these two cases. The ink set disclosed as being preferred contains 12 inks.

U.S. Pat. No. 6,336,721 discloses a method for multi-color printing using a first set of CMY (and optionally K) inks, and a second set containing a specific chemical formulae for a yellow dye, and/or an orange dye, and/or a red dye and/or a blue dye. The disclosure shows how inks made from mixtures of these dyes can expand the color gamut of the existing CMYK ink set.

U.S. Pat. No. 6,508,549 similarly discusses an ink set containing a specific magenta dye which is part of an ink set containing a yellow dye ink, a cyan dye ink and an orange and/or green and/or violet ink.

U.S. Pat. No. 5,988,791 discloses that when an additional color, in this case blue, is added to the ink set for textile printing, mixtures of light cyan and magenta can be used to print the lighter blue shades.

All of the above-identified publications are incorporated by reference herein for all purposes as if fully set forth.

The art described above attempts to improve image quality by making piecemeal additions to the basic CMY ink set to address specific issues; however, none of the solutions in themselves provides both a range of colors able to reproduce photographs and computer monitor images as well as reproduce light color tones. In addition many of the solutions assume that it is a simple matter to add colors to the ink set. This may be the case in many conventional (non-inkjet) printing processes; however, in inkjet printing the number of ink slots available is both fixed by the printer design and also limited due to the scanning nature of much ink-jet printing which limits the width and weight of the printhead.

There is, consequently, a need for an ink set that integrates (a) a systematic method of expanding the color gamut, with (b) a method of printing light tones, highlights and grayscales using (c) a limited number of ink channels. It is an object of this invention to provide an ink set that address these issues.

SUMMARY OF THE INVENTION

The present invention provides an ink set comprising at least six differently colored inks, wherein three of the inks correspond to the three additive primary colors (red, green and blue) and three of the inks correspond to the subtractive primary colors (cyan, magenta and yellow). The dye content in the additive primary color inks should be higher, and preferably substantially higher, than the dye content of the three subtractive primary color inks.

Thus, in accordance with one aspect of the present invention, there is provided a first inkjet ink set comprising:
(a) a first aqueous dye-based ink that is cyan in color and has a hue angle of between about 180 and about 250;
(b) a second aqueous dye-based ink that is yellow in color and has a hue angle between about 70 and about 120;
(c) a third aqueous dye-based ink that is magenta in color and has a hue angle of between about 320 and about 10;
(d) a fourth aqueous dye-based ink that is blue in color and has a hue angle between about 250 and about 320;
(e) a fifth aqueous dye-based ink that is red in color and has a hue angle between about 10 and about 70; and
(f) a sixth aqueous dye-based ink that is green in color and has a hue angle between about 120 and about 180.

In accordance with another aspect of the present invention, there is provided a second inkjet ink set comprising:
(a) a first aqueous dye-based ink that is cyan in color and has a dye content of up to about 4% by weight based on the total weight of said first ink;
(b) a second aqueous dye-based ink that is yellow in color and has a dye content of up to about 4% by weight based on the total weight of said second ink;
(c) a third aqueous dye-based ink that is magenta in color and has a dye content of up to about 4% by weight based on the total weight of said third ink;
(d) a fourth aqueous dye-based ink that is blue in color and has a dye content of at least about 4% by weight based on the total weight of said fourth ink;
(e) a fifth aqueous dye-based ink that is red in color and has a dye content of at least about 4% by weight based on the total weight of said fifth ink; and
(f) a sixth aqueous dye-based ink that is green in color and has a dye content of at least about 4% by weight based on the total weight of said sixth ink.

Preferably the ink set has both sets of characteristics described above. Also preferably the inkjet inks sets further comprise an aqueous black ink.

One advantage of the present ink set is expanded color gamut. Another advantage is improved image quality (less grainy light tones) because the concentration of the CYM inks is kept low (by removing the need to make secondary colors with CYM). Another advantage is more desirable secondary colors due to the presence of the RGB inks, and in addition, the secondary colors are achieved with lower ink load. Yet another advantage is a more attractive composite achieved by using RGB.

In accordance with yet another aspect of the present invention, there is provided an inkjet printer responsive to digital data signals, that has been equipped with an inkjet ink set as described above. Preferably the printer is further equipped with a page-width printhead array.

In yet another aspect of the present invention, there is provided a method for ink jet printing onto a substrate, comprising the steps of:
(a) providing an ink jet printer that is responsive to digital data signals;
(b) loading the printer with a substrate to be printed;
(c) loading the printer with an inkjet ink set as set forth above and described in further detail below; and
(d) printing onto the substrate using the ink or inkjet ink set in response to the digital data signals.

Preferred substrates include plain paper, photo paper and textiles.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

Colored Inks

The colored inks of the present ink sets comprise a vehicle, preferably an aqueous vehicle, and a colorant. The colorant can be soluble (dye) or dispersed (pigment) in the ink vehicle (mixtures of these are included as well).

Conventional dyes, such as anionic, cationic, amphoteric and non-ionic dyes, are useful in this invention. Such dyes are in general well known to those of ordinary skill in the art.

Anionic dyes are those dyes that, in aqueous solution, yield colored anions. Cationic dyes are those dyes that, in aqueous solution, yield colored cations. Typically anionic dyes contain carboxylic or sulfonic acid groups as the ionic moiety. Cationic dyes usually contain quaternary nitrogen groups.

The types of anionic dyes most useful in this invention are, for example, Acid, Direct, Food, Mordant and Reactive dyes.

Preferred anionic dyes are those selected from the group consisting of nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds and phthalocyanine compounds.

Preferred cationic dyes include mainly the basic dyes and some of the mordant dyes that are designed to bind acidic sites on a substrate, such as fibers. Useful types of such dyes include the azo compounds, diphenylmethane compounds, triarylmethanes, xanthene compounds, acridine compounds, quinoline compounds, methine or polymethine compounds, thiazole compounds, indamine or indophenyl compounds, azine compounds, oxazine compounds and thiazine compounds, among others, all of which are generally well known to those skilled in the art.

Dyes are referred to herein by their "C.I." designation established by Society Dyers and Colourists, Bradford, Yorkshire, UK and published in the *The Color Index*, Third Edition, 1971 (the relevant disclosure of which is incorporated by reference herein for all purposes as if fully set forth). The CI designation uses a perceived color as part of the name, but there is no formal spectral definition of what constitutes orange, red, violet, blue, green, etc. For the purposes of this invention, ink color will be named according to hue angle ranges as follows (between about and about).

| Color | Hue Angle Range |
| --- | --- |
| Red | 10-70 |
| Yellow | 70-120 |
| Green | 120-180 |
| Cyan | 180-250 |
| Blue | 250-320 |
| Magenta | 320-10 |

In choosing colorants for an ink set, the hue angle for a given color preferably falls within the following ranges (between about and about).

| Color | Hue Angle Range |
| --- | --- |
| Red | 15-65 |
| Yellow | 75-110 |
| Green | 135-165 |
| Cyan | 195-230 |
| Blue | 265-305 |
| Magenta | 325-360 |

The hue angle is determined by spectrophotometric measurement of a solution or by printing an ink onto high quality inkjet media, such as photo paper, and measuring the color with a spectrometer. In the case where hue angle differs substantially between methods, the solution measurement should be preferred.

Useful CMY dyes include (cyan) Acid Blue 9 and Direct Blue 199; (magenta) Acid Red 52, Reactive Red 180, Acid Red 37 and Reactive Red 23; and (yellow) Direct Yellow 86, Direct Yellow 132 and Acid Yellow 23.

Useful RGB dyes include (red) Reactive Orange 16, Reactive Red 123, Reactive Red 43, Reactive Orange 13, Acid Red 337 and Acid Red 415; (blue) Reactive Blue 49, Reactive Blue 19, Reactive Blue 72, Reactive Blue 21, Acid Blue 83 and Acid Blue 260; and (green) Reactive Green 12.

Inks may also be formed from a mixture of dyes, for example a red ink may be a mixture of Reactive Red 180 and Reactive Yellow 84, and a green ink may be a mixture of Reactive Blue 72 and Reactive Yellow 85. The "dye content" in a given ink refers the total dye present in that ink, whether a single dye species or a combination of two or more dye species.

An ink set may also include a black ink. Black colorant may also be dye as, for example, the black dye disclosed in U.S. Pat. No. 5,753,016 (the disclosure of which is incorporated by reference herein for all purposes as if fully set forth). Black colorant may also be a pigment, such as PB 7 (carbon black).

Pigments, traditionally, are stabilized to dispersion in a vehicle by dispersing agents, such as polymeric dispersants or surfactants. More recently though, so-called "self-dispersible" or "self-dispersing" pigments (hereafter "SDP") have been developed. As the name would imply, SDPs are dispersible in water, or aqueous vehicle, without dispersants. The black pigment may be stabilized to dispersion by surface treatment to be self-dispersing (see, for example, US 20020014184, the disclosure of which is incorporated by reference herein for all purposes as if fully set forth), by treatment with dispersant in the traditional way, or by some combination of surface treatment and dispersant.

Preferably, when dispersant is employed, the dispersant(s) is a random or structured polymeric dispersant. Preferred random polymers include acrylic polymer and styrene-acrylic polymers. Most preferred are structured dispersants which include AB, BAB and ABC block copolymers, branched polymers and graft polymers. Some useful structured polymers are disclosed in U.S. Pat. No. 5,085,698, EP-A-0556649 and U.S. Pat. No. 5,231,131 (the disclosures of which are incorporated by reference herein for all purposes as if fully set forth).

Useful pigment particle size is typically in the range of from about 0.005 micron to about 15 micron. Preferably, the pigment particle size should range from about 0.005 to about 5 micron, more preferably from about 0.005 to about 1 micron, and most preferably from about 0.005 to about 0.3 micron.

Vehicle

The vehicle is preferably an "aqueous vehicle" by which is meant water or a mixture of water and at least one water-soluble organic solvent (co-solvent). Selection of a suitable mixture depends on requirements of the specific application, such as desired surface tension and viscosity, the selected colorant, drying time of the ink, and the type of substrate onto which the ink will be printed. Representative examples of water-soluble organic solvents that may be selected are disclosed in U.S. Pat. No. 5,085,698 (the disclosure of which is incorporated by reference herein for all purposes as if fully set forth).

If a mixture of water and a water-soluble solvent is used, the aqueous vehicle typically will contain about 30% to about 95% water with the balance (i.e., about 70% to about 5%) being the water-soluble solvent. Preferred compositions contain about 60% to about 95% water, based on the total weight of the aqueous vehicle.

Inks based on aqueous vehicles can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-isopropyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-C4-6 alkanediols, most preferably 1,2-hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added must be properly determined, but is typically in the range of from about 1 to about 15% by weight and more typically about 2 to about 10% by weight, based on the total weight of the ink. Surfactants may be used, typically in the amount of about 0.01 to about 5% and preferably about 0.2 to about 2%, based on the total weight of the ink.

Other Ingredients

Other ingredients may be formulated into the inkjet ink to the extent that such other ingredients do not interfere with the stability and jetablity of the ink, which may be readily determined by routine experimentation. Such other ingredients are in a general sense well known in the art.

Polymers may be added to the ink to improve durability. The polymers can be soluble in the vehicle or dispersed (e.g. "emulsion polymer" or "latex"), and can be ionic or nonionic. Useful classes of polymers include acrylics, styrene-acrylics and polyurethanes.

Biocides may be used to inhibit growth of microorganisms.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

For example, the amount of vehicle in an ink, whether aqueous or non-aqueous, is typically in the range of about 70% to about 99.8%, and preferably about 80% to about 99.8%, based on total weight of the ink.

In a colored ink, colorant will generally be present in amounts up to about 12%, and more typically in the range of about 0.1 to about 9%, by weight of the total ink. Dispersants, when needed for stabilization of an insoluble colorant, are employed at levels based on the amount of colorant and are usually expressed as a weight ratio. Generally, dispersants are employed at a pigment-to-dispersant weight ratio in the range of about 1:3 to about 4:1.

In the specific context of the CMYRGB ink set of the present invention, the RGB inks should have a higher dye content than the CMY inks. Preferably the CMY inks have a dye content of up to about 4% by weight, more preferably from about 1.5% up to about 4% by weight, and the RGB inks have a dye content of at least about 4% by weight, more preferably from about 5% to about 9% by weight, based on the total weight of the respective ink.

Other ingredients (additives), when present, generally comprise less than about 15% by weight, based on the total weight of the ink. Surfactants, when added, are generally in the range of about 0.2 to about 3% by weight based on the total weight of the ink. Polymers, other than polymeric fixing agents, can be added as needed, but will generally be less than about 15% by weight based on the total weight of the ink.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C. (30 cP or less), but is typically somewhat lower (less than 30 cP). The ink has physical properties that are adjusted to the ejecting conditions and printhead design. The inks should have excellent storage stability for long periods so as not clog to a significant extent in an ink jet apparatus. Further, the ink should not corrode parts of the inkjet printing device it comes in contact with, and it should be essentially odorless and non-toxic.

Although not restricted to any particular viscosity range or printhead, the application contemplated by this invention will generally require lower viscosity ink. Thus the viscosity (at 25° C.) of the inks can be less than about 7 cps; less than about 5 cps, and even less than about 3.5 cps.

Ink Set

The term "ink set" refers to all the fluids an inkjet printer is equipped to jet. These fluids include the at least six colored inks described above. Other inks (or fluids) could also be present such as, for example, an additional colorless ink containing a durability or gloss enhancing ingredient which would be applied after all of the colored inks (a "top-coat") to increase abrasion resistance and/or gloss of the printed images. Another type of such fluid is a (preferably colorless) fixer fluid, such as disclosed in commonly owned U.S. application Ser. No. 11/013,128 (filed Dec. 15, 2004) (claiming priority from U.S. Provisional Appln. No. 60/533,068 (filed 29 Dec. 2003)), the disclosure of which is incorporated by reference herein for all purposes as if fully set forth.

As indicated above, the ink set may also contain one or more black inks. The black ink colorant may be a dye or pigment or a combination of one or more dyes and/or a combination of dye and pigment. An ink set with more than two black inks might contain a dye based black and a pigment based black.

A CYMRGB ink set preferably comprises:

a cyan ink with a colorant selected from the group consisting of Acid Blue 9, Direct Blue 199 and combinations thereof;

a yellow ink with a colorant selected from the group consisting of Direct Yellow 86, Direct Yellow 132, Acid Yellow 23 and combinations thereof;

a magenta ink with a colorant selected from the group consisting of Acid Red 52, Reactive Red 180, Acid Red 37, Reactive Red 23 and combinations thereof;

a blue ink with a colorant selected from the group consisting of Reactive Blue 49, Reactive Blue 19, Reactive Blue 72, Reactive Blue 21, Acid Blue 83, Acid Blue 260 and combinations thereof;

a red ink with a colorant selected from the group consisting of Reactive Orange 16, Reactive Red 123, Reactive Red 43, Reactive Orange 13, Acid Red 337, Acid Red 415, a Reactive Red 180/Reactive Yellow 84 mixture, and combinations thereof;

a green in with a colorant selected from the group consisting of Reactive Green 12, a Reactive Blue 72/Reactive Yellow 85 mixture, and combinations thereof; and any subcombination thereof.

Printer

The present ink sets are advantageous for reducing the volume of ink jetted and, therefore, are particularly well suited for application by inkjet printers that apply all the ink in one pass. Such printers can be, for example, those equipped with a printhead array that is fixed in position (fixed array).

The printer can be, for example, similar to that described in U.S. Pat. No. 6,443,555 (the disclosure of which is incorporated by reference herein for all purposes as if fully set forth). The printhead(s) for such a printer can be, for example, those described in U.S. Pat. No. 6,426,014 and US20020033863 (the disclosures of which are also incorporated by reference herein for all purposes as if fully set forth).

The fixed array printers will generally be capable of printing at least about 600 dpi, preferably at least about 1200 dpi, and more preferably at least about 1600 dpi. Printing is preferably accomplished in one pass and thus the printhead is configured to achieve the stipulated dpi in a single pass of the substrate through the print zone.

The width of the printing zone is at least as wide as the width of the area to be printed so that printing can be performed rapidly in one pass. Accordingly, printheads of this sort are commonly referred to as page-wide arrays or full-width arrays. For so-called "SOHO" (small office, home office) and "network" printing, the width of the printing zone is at least wide as standard papers, such as A4 size paper and/or letter size (8.5×11 inch) paper. For so-called "wide-format" printing, the print zone is preferably at least about 36 inches wide and can accommodate media that is fed from a roll.

Ink jet printers are responsive to digital data signals, and are equipped with a printhead array that is fixed in position (fixed array). Although the ink droplets ejected from the printhead can be of any suitable volume, preferably droplets are less than about 10 pL, and more preferably in the range of about 1 to about 5 pL, even more preferably about 1 to about 2 pL.

Substrates

Substrates suitable for use in the present invention can be any useful substrate known to those of ordinary skill in the relevant art. For example, the substrate can be plain paper such as common electrophotographic copier paper. The substrate can also be specialty media such as microporous papers, polymer coated papers and hybids of the two. The substrate can be polymeric film such as vinyl chloride and polyester. Polymeric films are especially useful in wide-format applications such as signs, billboards and banners. The substrate can be a non-woven textile such as spun bonded polyolefin (e.g. Tyvek®, DuPont Co.). The substrate can also be woven textile such as silk, cotton, nylon and polyester.

EXAMPLES

Inks were prepared according to the following formulations. Ingredients were mixed together and filtered. Water was deionized. Surfynol® 465 is a surfactant from Air Products Corp (Allentown, Pa., USA). Proxel™ GXL is a Biocide from Avecia (Wilmington, Del., USA).

Cyan Inks

| Ingredients | Ink 1 | Ink 2 | Ink 3 | Ink 4 |
| --- | --- | --- | --- | --- |
| Direct Blue 199 | 2.0% | 3.0% | 4.0% | 6.0% |
| Glycerol | 8.5% | 8.5% | 8.5% | 8.5% |
| Surfynol® 465 | 0.5% | 0.5% | 0.5% | 0.5% |
| Proxel™ GXL | 0.25% | 0.25% | 0.25% | 0.25% |
| Water | Bal. to 100% | Bal. to 100% | Bal. to 100% | Bal. to 100% |

Hue angle was 223 in solution and 221 printed on Epson premium Glossy paper.

Magenta Inks

| Ingredients | Ink 5 | Ink 6 | Ink 7 | Ink 8 |
| --- | --- | --- | --- | --- |
| Reactive Red 180 and Acid Red 52 (95:5) | 2.0% | 3.0% | 4.0% | 6.0% |
| Glycerol | 8.5% | 8.5% | 8.5% | 8.5% |
| Surfynol® 465 | 0.5% | 0.5% | 0.5% | 0.5% |
| Proxel™ GXL | 0.25% | 0.25% | 0.25% | 0.25% |
| Water | Bal. to 100% | Bal. to 100% | Bal. to 100% | Bal. to 100% |

The hue angle, in solution, of RR 180 was 351 and AR 52 was 323. The printed ink containing the dye mixture had a hue angle of 345 printed on Epson premium Glossy paper.

Yellow Inks

| Ingredients | Ink 9 | Ink 10 | Ink 11 | Ink 12 |
| --- | --- | --- | --- | --- |
| Acid Yellow 23 | 2.0% | 3.0% | 4.0% | 6.0% |
| Glycerol | 8.5% | 8.5% | 8.5% | 8.5% |
| Surfynol® 465 | 0.5% | 0.5% | 0.5% | 0.5% |
| Proxel™ GXL | 0.25% | 0.25% | 0.25% | 0.25% |
| Water | Bal. to 100% | Bal. to 100% | Bal. to 100% | Bal. to 100% |

Hue angle was 107 in solution and 93 printed on Epson premium Glossy paper.

Red Inks

| Ingredients | Ink 13 | Ink 14 | Ink 15 | Ink 16 |
|---|---|---|---|---|
| Evercion Scarlet H-E2G (Everlight Chemical Industrial Corp.) | 2.0% | 4.0% | 6.0% | 8.0% |
| Glycerol | 8.5% | 8.5% | 8.5% | 8.5% |
| Surfynol ® 465 | 0.5% | 0.5% | 0.5% | 0.5% |
| Proxel ™ GXL | 0.25% | 0.25% | 0.25% | 0.25% |
| Water | Bal. to 100% | Bal. to 100% | Bal. to 100% | Bal. to 100% |

Hue angle was 36 in solution and 36 printed on Epson premium Glossy paper.

Blue Inks

| Ingredients | Ink 17 | Ink 18 | Ink 19 | Ink 20 |
|---|---|---|---|---|
| Reactive Blue 49 | 2.0% | 4.0% | 6.0% | 8.0% |
| Glycerol | 8.5% | 8.5% | 8.5% | 8.5% |
| Surfynol ® 465 | 0.5% | 0.5% | 0.5% | 0.5% |
| Proxel ™ GXL | 0.25% | 0.25% | 0.25% | 0.25% |
| Water | Bal. to 100% | Bal. to 100% | Bal. to 100% | Bal. to 100% |

Hue angle was 280 in solution and 288 printed on Epson premium Glossy paper.

Green Inks

| Ingredients | Ink 21 | Ink 22 | Ink 23 | Ink 24 |
|---|---|---|---|---|
| Jettex ® Green 2GM (DyStar Corp.) | 2.0% | 4.0% | 6.0% | 8.0% |
| Glycerol | 8.5% | 8.5% | 8.5% | 8.5% |
| Surfynol ® 465 | 0.5% | 0.5% | 0.5% | 0.5% |
| Proxel ™ GXL | 0.25% | 0.25% | 0.25% | 0.25% |
| Water | Bal. to 100% | Bal. to 100% | Bal. to 100% | Bal. to 100% |

Hue angle was 149 in solution and 157 printed on Epson premium Glossy paper.

Black Ink

| Ingredients | Ink 25 |
|---|---|
| Reactive Black 31 | 4.5% |
| Glycerol | 8.5% |
| Surfynol ® 465 | 0.5% |
| Proxel ™ GXL | 0.25 |
| Water | Bal. to 100% |

Measurements

Inks were printed using a Canon i550 printer onto Epson Premium Glossy Photo Paper. Color values were measured using a Greytag-Macbeth Spectrolino spectrometer.

The hue angle of a dye in solution was measured with a Hewlett Packard 8453 UV-Visible Spectrophotometer. The dye solution was diluted until the absorbance of the peak absorbance wavelength, lambda max, was between 0.4 and 0.8 absorbance units. The instrument software calculated the L*a*b* values and hue and chroma automatically from the measured spectrum.

Gamut volume was calculated according to methods described in US20040100643, the disclosure of which is incorporated by reference herein for all purposes as if fully set forth. The volume reported in thousands of L*a*b* units.

Example 1

Control

The following table shows OD and chroma for CYM as a function of dye concentration. Although the OD continues to increase, the chroma for Cyan and Magenta peaks then drops.

| | Cyan | | Magenta | | Yellow | |
|---|---|---|---|---|---|---|
| % Dye | OD | Chroma | OD | Chroma | OD | Chroma |
| 2% | 1.69 | 66 | 1.44 | 79 | 1.63 | 100 |
| 3% | 2.19 | 69 | 2.05 | 83 | 1.68 | 102 |
| 4% | 2.46 | 67 | 2.32 | 81 | 1.69 | 102 |
| 6% | 2.45 | 58 | 2.42 | 79 | 1.71 | 103 |

The table above shows that the color gamut volume of the CMYK ink set does not change substantially over the range of CMY dye concentrations.

| Cyan | Magenta | Yellow | Black | Gamut Volume |
|---|---|---|---|---|
| 2.0% | 2.0% | 2.0% | Ink 25 | 439 |
| 4.0% | 4.0% | 4.0% | Ink 25 | 493 |
| 6.0% | 6.0% | 6.0% | Ink 25 | 429 |

The 2.0%, 3.0%, 4.0% and 6.0% cyan refers to Inks 1-4, respectively. Likewise 2.0%, 3.0%, 4.0% and 6.0% magenta refers to Inks 5-8, respectively, and 2.0%, 3.0%, 4.0% and 6.0% yellow refers to Inks 9-12, respectively.

For a CYMK ink set, no advantage in overall gamut volume is achieved by increasing concentrations. But high dye loading provides more attractive secondary colors. The trade off for better secondaries though is more "grainy" light tones as few ink dots are printed in a given area.

In using the inventive ink set, trade offs are avoided. The CMY ink can be kept low without sacrificing color reproduction and so reduce the appearance of graininess. Light tones of red, green and blue can then be printed using mixtures of cyan, yellow and magenta to avoid graininess in these colors.

Example 2

For each of the ink sets shown in the tables below solid color patches of yellow, red, magenta, blue, cyan, green and black were printed and the L*a*b* values were measured. The L*a*b* values for the substrate (white) were also measured. The color gamut volume was measured as the volume in L*a*b* units enclosed between these eight points. For the CMYRGB ink sets two values of red, green and blue were used: the value from the RGB inks and the values obtained from mixtures of CMY inks.

| Cyan | Magenta | Yellow | Black | Red | Blue | Green | Gamut Volume |
|------|---------|--------|-------|------|------|-------|--------------|
| 4.0% | 4.0%    | 4.0%   | 4.5%  | —    | —    | —     | 493          |
| —    | —       | —      | —     | 4.0% | 4.0% | 4.0%  | 242          |
| 4.0% | 4.0%    | 4.0%   | —     | 2.0% | 2.0% | 2.0%  | 614          |
| 4.0% | 4.0%    | 4.0%   | —     | 4.0% | 4.0% | 4.0%  | 614          |
| 4.0% | 4.0%    | 4.0%   | —     | 6.0% | 6.0% | 6.0%  | 618          |
| 4.0% | 4.0%    | 4.0%   | —     | 8.0% | 8.0% | 8.0%  | 607          |

The RGB ink set used alone has a relatively small color gamut volume. This is because the colors mix additively rather than subtractively, and so when used in inks where the mixing mechanism is mainly subtractive they form muddy intermediate hues with low chroma values. However, when the RGB inks are used in conjunction with CMY inks the color gamut volume is much greater than the CMYK color gamut volume.

Changing the CYM dye concentration between about 2-6% did not substantially change the CYMRGB gamut volume. The optimum dye content for the RGB ink appears to be between about 5 to 7% by weight.

Example 3

The following table shows the chroma values for red, green and blue for an RGB ink compared to the chroma of the same secondary colors obtained using different CYM ink sets. The ink volume (in microliters per square inch) required to achieve these values is also noted. The results are from inks printed on Epson Premium Glossy Photo paper. The volume of ink printed per square inch was determined by weighing paper before and after printing a solid color patch of known area.

|               | Red    |          | Green  |          | Blue   |          |
|---------------|--------|----------|--------|----------|--------|----------|
| Ink Set       | Chroma | μL/in²   | Chroma | μL/in²   | Chroma | μL/in²   |
| CMY set A (2% dye) | 80 | 9.0 | 84 | 9.0 | 57 | 9.0 |
| CMY set B (4% dye) | 87 | 9.0 | 88 | 9.0 | 60 | 9.0 |
| CMY set C (6% dye) | 86 | 9.0 | 84 | 9.0 | 54 | 9.0 |
| RGB set (6% dye)   | 102 | 4.5 | 101 | 4.5 | 87 | 4.5 |

The CMY Set A is Inks 1, 5 and 9; the CMY Set B is Inks 3, 7 and 11; the CMY Set C is Inks 4, 8 and 12; and the RGB Set is Inks 15, 19 and 23.

Increasing the dye loading of CMY inks can increase the chroma of secondary colors, but not as much as printing directly with an RGB ink. Also, the CYM secondaries use twice as much ink volume. An inventive ink set containing CMYRGB inks can achieve more chromatic colors with less total ink volume.

Example 4

The following table shows the optical density of the composite three-color black on Epson Premium Glossy Photo Paper at different area fills using increasing amounts of ink. The composite black for CMY uses Inks 1, 5 and 9 and the RGB uses Inks 15, 19 and 23. The RGB composite black has much higher optical density at a given ink load than the CYM.

| Area Fill | CYM Composite Black Optical Density | RGB Composite Black Optical Density |
|-----------|-------------------------------------|-------------------------------------|
| 10%       | 0.13                                | 0.19                                |
| 20%       | 0.21                                | 0.33                                |
| 30%       | 0.31                                | 0.49                                |
| 50%       | 0.56                                | 0.93                                |
| 60%       | 0.69                                | 1.14                                |
| 70%       | 0.82                                | 1.33                                |
| 80%       | 0.97                                | 1.54                                |
| 90%       | 1.19                                | 1.83                                |
| 100%      | 1.39                                | 1.95                                |

The invention claimed is:

1. An inkjet ink set comprising:
    (a) a first aqueous dye-based ink that is cyan in color and has a hue angle of between about 180 and about 250;
    (b) a second aqueous dye-based ink that is yellow in color and has a hue angle between about 70 and about 120;
    (c) a third aqueous dye-based ink that is magenta in color and has a hue angle of between about 320 and about 10;
    (d) a fourth aqueous dye-based ink that is blue in color and has a hue angle between about 250 and about 320;
    (e) a fifth aqueous dye-based ink that is red in color and has a hue angle between about 10 and about 70;
    (f) a sixth aqueous dye-based ink that is green in color and has a hue angle between about 120 and about 180; and
    (g) a seventh aqueous dye-based ink that is black in color.

2. The inkjet ink set of claim 1, wherein:
    (a) the first aqueous dye-based ink has a dye content of about 4% by weight or less based on the total weight of said first ink;
    (b) the second aqueous dye-based ink has a dye content of about 4% by weight or less based on the total weight of said second ink;
    (c) the third aqueous dye-based ink has a dye content of about 4% by weight or less based on the total weight of said third ink;
    (d) the fourth aqueous dye-based ink has a dye content of about 4% by weight or greater based on the total weight of said fourth ink;
    (e) the fifth aqueous dye-based ink has a dye content of about 4% by weight or greater based on the total weight of said fifth ink; and
    (f) the sixth aqueous dye-based ink has a dye content of about 4% by weight or greater based on the total weight of said sixth ink.

3. The inkjet ink set of claim 1, wherein the dye content in each of the first, second and third inks is from about 1.5% to about 4% by weight, and the dye content in each of the fourth, fifth and sixth inks is about 5% to about 9% by weight, based on the total weight of the ink.

4. The inkjet ink set of claim 1, wherein the first aqueous dye-based ink has a hue angle of between about 195 and about 230; the second aqueous dye-based ink has a hue angle between about 75 and about 110; the third aqueous dye-based ink has a hue angle of between about 325 and about 360; the fourth aqueous dye-based ink has a hue angle between about 265 and about 305; the fifth aqueous dye-based ink has a hue angle between about 15 and about 65; and the sixth aqueous dye-based ink has a hue angle between about 135 and about 165.

5. The inkjet ink set of claim 2, wherein the first aqueous dye-based ink has a hue angle of between about 195 and about 230; the second aqueous dye-based ink has a hue angle between about 75 and about 110; the third aqueous dye-based ink has a hue angle of between about 325 and about 360; the fourth aqueous dye-based ink has a hue angle between about 265 and about 305; the fifth aqueous dye-based ink has a hue angle between about 15 and about 65; and the sixth aqueous dye-based ink has a hue angle between about 135 and about 165.

6. The inkjet ink set of claim 1, wherein the dye in said first ink is selected from the group consisting of Acid Blue 9, Direct Blue 199 and combinations thereof; and/or the dye in said second ink is selected from the group consisting of Direct Yellow 86, Direct Yellow 132, Acid Yellow 23 and combinations thereof; and/or the dye in said third ink is selected from the group consisting of Acid Red 52, Reactive Red 180, Acid Red 37, Reactive Red 23 and combinations thereof; and/or the dye in said fourth ink is selected from the group consisting of Reactive Blue 49, Reactive Blue 19, Reactive Blue 72, Reactive Blue 21, Acid Blue 83, Acid Blue 260 and combinations thereof; and/or the dye in said fifth ink is selected from the group consisting of Reactive Orange 16, Reactive Red 123, Reactive Red 43, Reactive Orange 13, Acid Red 337, Acid Red 415, a Reactive Red 180/Reactive Yellow 84 mixture, and combinations thereof; and/or the dye in said sixth ink is selected from the group consisting of Reactive Green 12, a Reactive Blue 72/Reactive Yellow 85 mixture, and combinations thereof.

7. The inkjet ink set of claim 2, wherein the dye in said first ink is selected from the group consisting of Acid Blue 9, Direct Blue 199 and combinations thereof; and/or the dye in said second ink is selected from the group consisting of Direct Yellow 86, Direct Yellow 132, Acid Yellow 23 and combinations thereof; and/or the dye in said third ink is selected from the group consisting of Acid Red 52, Reactive Red 180, Acid Red 37, Reactive Red 23 and combinations thereof; and/or the dye in said fourth ink is selected from the group consisting of Reactive Blue 49, Reactive Blue 19, Reactive Blue 72, Reactive Blue 21, Acid Blue 83, Acid Blue 260 and combinations thereof; and/or the dye in said fifth ink is selected from the group consisting of Reactive Orange 16, Reactive Red 123, Reactive Red 43, Reactive Orange 13, Acid Red 337, Acid Red 415, a Reactive Red 180/Reactive Yellow 84 mixture, and combinations thereof; and/or the dye in said sixth ink is selected from the group consisting of Reactive Green 12, a Reactive Blue 72/Reactive Yellow 85 mixture, and combinations thereof.

8. An inkjet ink set comprising:
(a) a first aqueous dye-based ink that is being cyan in color and has a dye content of up to about 4% by weight based on the total weight of said first ink;
(b) a second aqueous dye-based ink that is yellow in color and has a dye content of up to about 4% by weight based on the total weight of said second ink;
(c) a third aqueous dye-based ink that is magenta in color and has a dye content of up to about 4% by weight based on the total weight of said third ink;
(d) a fourth aqueous dye-based ink that is blue in color and has a dye content of at least about 4% by weight based on the total weight of said fourth ink;
(e) a fifth aqueous dye-based ink that is red in color and has a dye content of at least about 4% by weight based on the total weight of said fifth ink;
(f) a sixth aqueous dye-based ink that is green in color and has a dye content of at least about 4% by weight based on the total weight of said sixth ink; and
(g) a seventh aqueous dye-based ink that is black in color.

9. The Inkjet ink set of claim 8, wherein the dye content in each of the first, second and third inks is from about 1.5% to about 4% by weight, and the dye content in each of the fourth, fifth and sixth inks is about 5% to about 9% by weight, based on the total weight of the ink.

10. The inkjet ink set of claim 8, wherein the dye in said first ink is selected from the group consisting of Acid Blue 9, Direct Blue 199 and combinations thereof; and/or the dye in said second ink is selected from the group consisting of Direct Yellow 86, Direct Yellow 132, Acid Yellow 23 and combinations thereof; and/or the dye in said third ink is selected from the group consisting of Acid Red 52, Reactive Red 180, Acid Red 37, Reactive Red 23 and combinations thereof; and/or the dye in said fourth ink is selected from the group consisting of Reactive Blue 49, Reactive Blue 19, Reactive Blue 72, Reactive Blue 21, Acid Blue 83, Acid Blue 260 and combinations thereof; and/or the dye in said fifth ink is selected from the group consisting of Reactive Orange 16, Reactive Red 123, Reactive Red 43, Reactive Orange 13, Acid Red 337, Acid Red 415, a Reactive Red 180/Reactive Yellow 84 mixture, and combinations thereof; and/or the dye in said sixth ink is selected from the group consisting of Reactive Green 12, a Reactive Blue 72/Reactive Yellow 85 mixture, and combinations thereof.

11. An inkjet printer equipped with an ink set comprising:
(a) a first aqueous dye-based ink that is cyan in color and has a hue angle of between about 180 and about 250;
(b) a second aqueous dye-based ink that is yellow in color and has a hue angle between about 70 and about 120;
(c) a third aqueous dye-based ink that is magenta in color and has a hue angle of between about 320 and about 10;
(d) a fourth aqueous dye-based ink that is blue in color and has a hue angle between about 250 and about 320;
(e) a fifth aqueous dye-based ink that is red in color and has a hue angle between about 10 and about 70;
(f) a sixth aqueous dye-based ink that is green in color and has a hue angle between about 120 and about 180; and
(g) a seventh aqueous dye-based ink that is black in color.

12. The inkjet printer of claim 11, wherein:
(a) the first aqueous dye-based ink in the ink set has a dye content of about 4% by weight or less based on the total weight of said first ink;
(b) the second aqueous dye-based ink in the ink set has a dye content of about 4% by weight or less based on the total weight of said second ink;
(c) the third aqueous dye-based ink in the ink set has a dye content of about 4% by weight or less based on the total weight of said third ink;
(d) the fourth aqueous dye-based ink in the ink set has a dye content of about 4% by weight or greater based on the total weight of said fourth ink;
(e) the fifth aqueous dye-based ink in the ink set has a dye content of about 4% by weight or greater based on the total weight of said fifth ink; and
(f) the sixth aqueous dye-based ink in the ink set has a dye content of about 4% by weight or greater based on the total weight of said sixth ink.

13. The inkjet printer of claim 11, comprising a printhead that is a page-wide array.

14. An inkjet printer equipped with an ink set comprising:
(a) a first aqueous dye-based ink that is being cyan in color and has a dye content of up to about 4% by weight based on the total weight of said first ink;
(b) a second aqueous dye-based ink that is yellow in color and has a dye content of up to about 4% by weight based on the total weight of said second ink;
(c) a third aqueous dye-based ink that is magenta in color and has a dye content of up to about 4% by weight based on the total weight of said third ink;

(d) a fourth aqueous dye-based ink that is blue in color and has a dye content of at least about 4% by weight based on the total weight of said fourth ink;
(e) a fifth aqueous dye-based ink that is red in color and has a dye content of at least about 4% by weight based on the total weight of said fifth ink;
(f) a sixth aqueous dye-based ink that is green in color and has a dye content of at least about 4% by weight based on the total weight of said sixth ink; and
(g) a seventh aqueous dye-based ink that is black in color.

15. The inkjet printer of claim 14, comprising a printhead that is a page-wide array.

16. A method for ink jet printing onto a substrate, comprising the steps of:
(A) providing an ink jet printer that is responsive to digital data signals;
(B) loading the printer with a substrate to be printed;
(C) loading the printer with an inkjet ink set; and
(D) printing onto the substrate using the inkjet ink set in response to the digital data signals,
wherein the inkjet ink set comprises:
(a) a first aqueous dye-based ink that is cyan in color and has a hue angle of between about 180 and about 250;
(b) a second aqueous dye-based ink that is yellow in color and has a hue angle between about 70 and about 120;
(c) a third aqueous dye-based ink that is magenta in color and has a hue angle of between about 320 and about 10;
(d) a fourth aqueous dye-based ink that is blue in color and has a hue angle between about 250 and about 320;
(e) a fifth aqueous dye-based ink that is red in color and has a hue angle between about 10 and about 70;
(f) a sixth aqueous dye-based ink that is green in color and has a hue angle between about 120 and about 180; and
(g) a seventh aqueous dye-based ink that is black in color.

17. The method of claim 16, wherein:
(a) the first aqueous dye-based ink in the ink set has a dye content of about 4% by weight or less based on the total weight of said first ink;
(b) the second aqueous dye-based ink in the ink set has a dye content of about 4% by weight or less based on the total weight of said second ink;
(c) the third aqueous dye-based ink in the ink set has a dye content of about 4% by weight or less based on the total weight of said third ink;
(d) the fourth aqueous dye-based ink in the ink set has a dye content of about 4% by weight or greater based on the total weight of said fourth ink;
(e) the fifth aqueous dye-based ink in the ink set has a dye content of about 4% by weight or greater based on the total weight of said fifth ink; and
(f) the sixth aqueous dye-based ink in the ink set has a dye content of about 4% by weight or greater based on the total weight of said sixth ink.

18. The method of claim 16, wherein the inkjet printer comprises a printhead that is a page-wide array.

19. A method for ink jet printing onto a substrate, comprising the steps of:
(A) providing an ink jet printer that is responsive to digital data signals;
(B) loading the printer with a substrate to be printed;
(C) loading the printer with an inkjet ink set; and
(D) printing onto the substrate using the inkjet ink set in response to the digital data signals,
wherein the inkjet ink set comprises:
(a) a first aqueous dye-based ink that is being cyan in color and has a dye content of up to about 4% by weight based on the total weight of said first ink;
(b) a second aqueous dye-based ink that is yellow in color and has a dye content of up to about 4% by weight based on the total weight of said second ink;
(c) a third aqueous dye-based ink that is magenta in color and has a dye content of up to about 4% by weight based on the total weight of said third ink;
(d) a fourth aqueous dye-based ink that is blue in color and has a dye content of at least about 4% by weight based on the total weight of said fourth ink;
(e) a fifth aqueous dye-based ink that is red in color and has a dye content of at least about 4% by weight based on the total weight of said fifth ink;
(f) a sixth aqueous dye-based ink that is green in color and has a dye content of at least about 4% by weight based on the total weight of said sixth ink; and
(g) a seventh aqueous dye-based ink that is black in color.

20. The method of claim 19, wherein the inkjet printer comprises a printhead that is a page-wide array.

21. The inkjet ink set according to either of claims 1 or 8 further comprising an eighth ink that is a second black ink.

22. The inkjet ink set according to claim 21 wherein said second black ink comprises carbon black pigment.

23. The inkjet ink set according to claim 21 wherein the seventh aqueous ink that is black in color is a dye-based ink and the eighth ink that is a second black ink comprises carbon black pigment.

24. An inkjet ink set comprising:
(a) a first aqueous dye-based ink that is cyan in color and has a hue angle of between about 180 and about 250;
(b) a second aqueous dye-based ink that is yellow in color and has a hue angle between about 70 and about 120;
(c) a third aqueous dye-based ink that is magenta in color and has a hue angle of between about 320 and about 10;
(d) a fourth aqueous dye-based ink that is blue in color and has a hue angle between about 250 and about 320;
(e) a fifth aqueous dye-based ink that is red in color and has a hue angle between about 10 and about 70;
(f) a sixth aqueous dye-based ink that is green in color and has a hue angle between about 120 and about 180; and
(g) a seventh aqueous ink that is black in color;
further comprising an eighth ink that is a colorless ink containing a durability enhancing or gloss enhancing ingredient.

25. An inkjet ink set comprising:
(a) a first aqueous dye-based ink that is cyan in color and has a hue angle of between about 180 and about 250;
(b) a second aqueous dye-based ink that is yellow in color and has a hue angle between about 70 and about 120;
(c) a third aqueous dye-based ink that is magenta in color and has a hue angle of between about 320 and about 10;
(d) a fourth aqueous dye-based ink that is blue in color and has a hue angle between about 250 and about 320;
(e) a fifth aqueous dye-based ink that is red in color and has a hue angle between about 10 and about 70;
(f) a sixth aqueous dye-based ink that is green in color and has a hue angle between about 120 and about 180; and
(g) a seventh aqueous ink that is black in color;
further comprising an eighth ink that is a fixing fluid.

* * * * *